US 6,722,675 B2

(12) United States Patent
Bidwell

(10) Patent No.: US 6,722,675 B2
(45) Date of Patent: Apr. 20, 2004

(54) STEERABLE LOAD-CARRYING ASSEMBLIES

(75) Inventor: Alan Leslie Bidwell, Yarraville (AU)

(73) Assignee: IGC (Australia) Pty. Ltd. (AU)

( * ) Notice: Subject to any disclaimer, the term of this patent is extended or adjusted under 35 U.S.C. 154(b) by 0 days.

(21) Appl. No.: 10/454,286

(22) Filed: Jun. 4, 2003

(65) Prior Publication Data

US 2003/0197342 A1 Oct. 23, 2003

Related U.S. Application Data

(62) Division of application No. 10/124,570, filed on Apr. 17, 2002, now Pat. No. 6,592,132, which is a division of application No. 09/529,497, filed as application No. PCT/AU98/00214 on Mar. 30, 1998, now Pat. No. 6,554,298.

(30) Foreign Application Priority Data

Oct. 15, 1997 (AU) ............................................. PO9807
Nov. 27, 1997 (AU) ............................................. PP0590

(51) Int. Cl.⁷ ................................................. B62B 3/00
(52) U.S. Cl. ...................... 280/89; 280/272; 280/47.11
(58) Field of Search ................... 280/47.11, 89, 280/89.11, 89.12, 93.5, 93.501, 272, 444

(56) References Cited

U.S. PATENT DOCUMENTS

| 389,568 A | 8/1888 | Harden |
| 2,029,540 A | 2/1936 | Porteous |

(List continued on next page.)

FOREIGN PATENT DOCUMENTS

| DE | 887607 | 8/1953 |
| DE | 3039947 | 6/1982 |
| DE | 3506915 A1 | 8/1986 |
| DE | 3514638 | 10/1986 |
| DE | 19514092 | 10/1996 |
| EP | 0814009 A2 | 12/1997 |
| FR | 1034515 | 7/1953 |
| SU | 656900 | 4/1977 |
| TW | 200634 | 2/1993 |
| WO | 96/29228 | 9/1996 |

*Primary Examiner*—Lesley D. Morris
*Assistant Examiner*—Tony Winner
(74) *Attorney, Agent, or Firm*—Baker Botts LLP

(57) ABSTRACT

A moveable load-carrying assembly including a chassis (1) having a plurality of wheels (6) arranged as a first wheel set and a second wheel set, each wheel (6) being rotatable and swivellable relative to the chassis (1); the wheels (6) of the first wheel set being connected by a first linkage (21), and the wheels (6) of the second wheel set being connected by a second linkage (22); and wherein one of the wheels (6) of the second wheel set is linked to the opposite one of the wheels (6) of the first wheel set by a link (11) such that when one of the wheels (6) of the first wheel set is swivelled in one direction relative to the chassis (1), all the wheels (6) of the first wheel set swivel in that direction in unison, and all the wheels (6) of the second wheel set swivel in the opposite direction in unison. Means are included to provide three distinct modes of operation for a wheel set, the modes corresponding to straight-line travel, fully-steerable travel and a braking mode. The assembly also includes an apparatus for returning the steerable wheels to a straight-line position, comprising a first member (203) associated with a tie rod (202) operably connected to one or more steerable wheels, at least one further member (205, 206) pivotably associated with a fixed chassis member (201) and a resilient means (209) associated with the further member.

10 Claims, 9 Drawing Sheets

U.S. PATENT DOCUMENTS

| | | |
|---|---|---|
| 2,673,091 A | 3/1954 | Planalp |
| 2,799,514 A | 7/1957 | Kramcsak |
| 3,211,467 A | 10/1965 | Siddall |
| 3,410,571 A | 11/1968 | Bishop |
| 3,430,975 A * | 3/1969 | Wolf .......................... 280/103 |
| 3,695,628 A * | 10/1972 | Fisher ........................ 280/103 |
| 3,828,392 A | 8/1974 | Bolger |
| 4,257,619 A | 3/1981 | Fisher |
| 4,309,791 A | 1/1982 | Aulik |
| 4,655,467 A * | 4/1987 | Kitzmiller et al. .......... 280/444 |
| 4,683,973 A | 8/1987 | Honjo et al. |
| 4,847,945 A | 7/1989 | Schwartz et al. |
| 4,950,126 A | 8/1990 | Fabiano et al. |
| 5,029,886 A | 7/1991 | Takahashi et al. |
| 5,090,719 A | 2/1992 | Hanaoka |
| RE34,433 E | 11/1993 | Heiligenthal et al. |
| 5,322,140 A | 6/1994 | Bussinger |
| 5,340,142 A * | 8/1994 | Kuhns ........................ 280/444 |
| 5,415,423 A | 5/1995 | Allsop et al. |
| 5,492,353 A | 2/1996 | Chapman |
| 5,503,416 A | 4/1996 | Aoki et al. |
| 5,527,053 A * | 6/1996 | Howard ....................... 280/90 |
| 5,531,466 A | 7/1996 | Hayashi |
| 5,704,623 A | 1/1998 | Chapman |
| 5,873,592 A | 2/1999 | Daenens |
| 5,899,482 A | 5/1999 | Kimura |

* cited by examiner

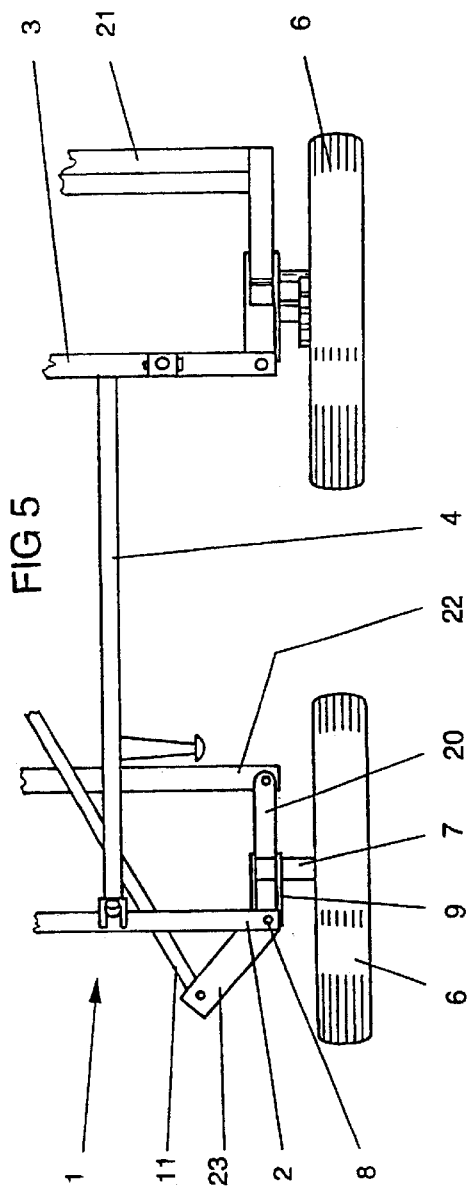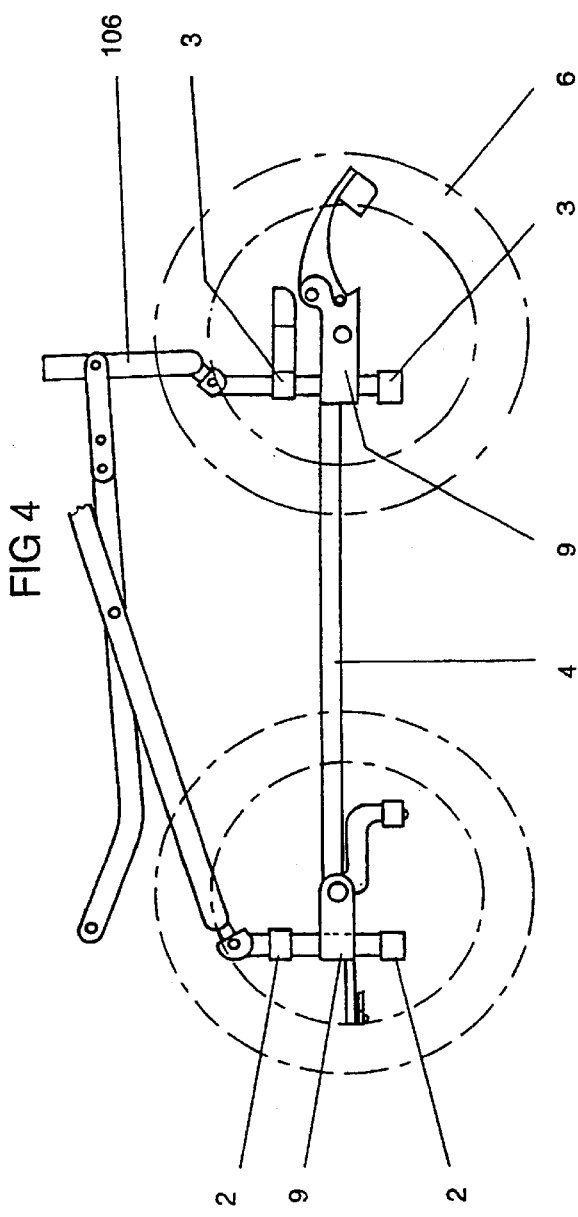

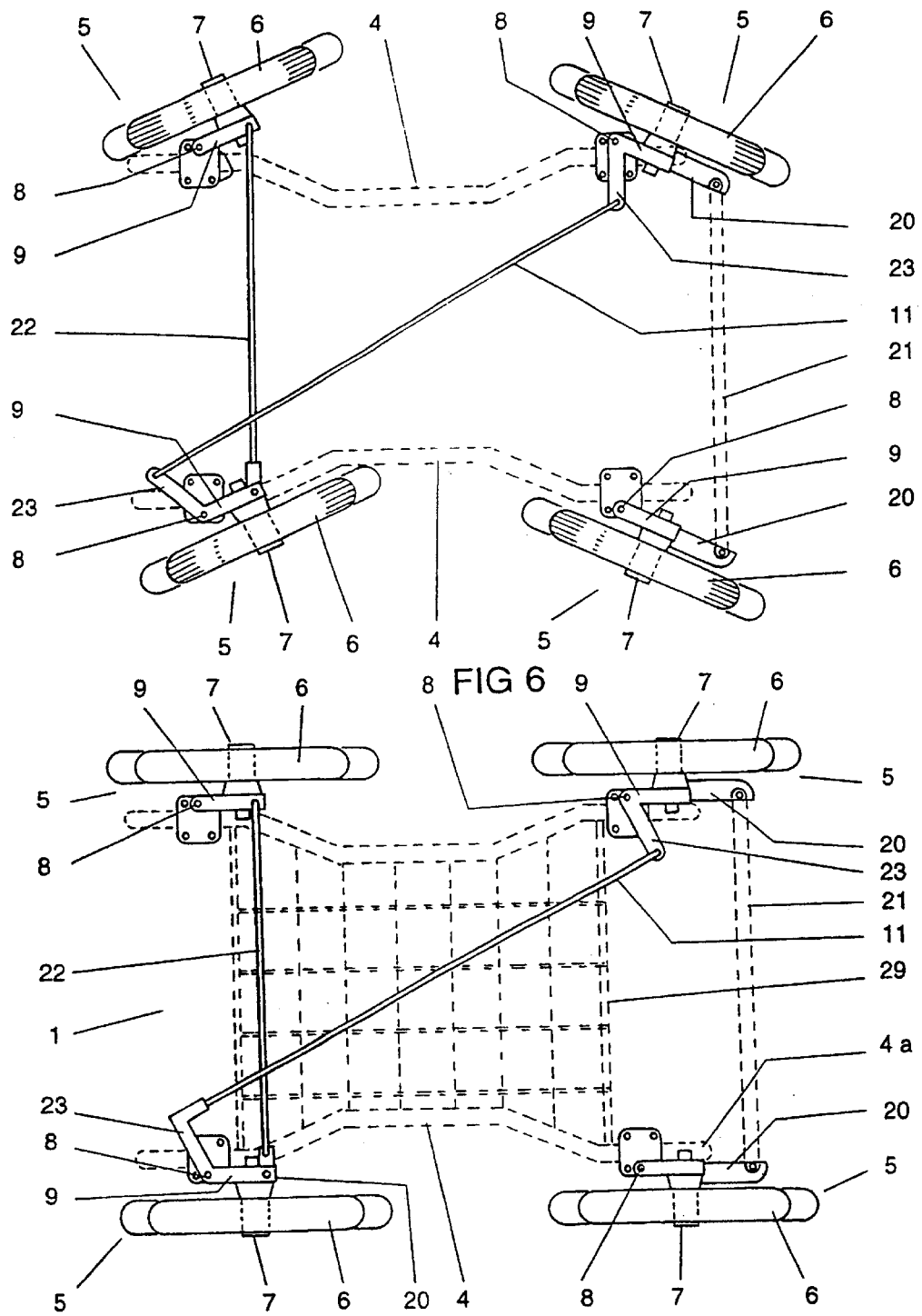

STEERABLE LOAD-CARRYING ASSEMBLIES

This is a divisional of U.S. Ser. No. 10/124,570, filed Apr. 17, 2002 now U.S. Pat. No. 6,592,132 which is a divisional of Ser. No. 09/529,497 filed May 31, 2000 now U.S. Pat. No. 6,554,298, which is a 371 of PCT/AU98/00214, filed Mar. 30, 1998.

FIELD OF THE INVENTION

The present invention relates to improvements in moveable load-carrying assemblies and refers particularly, but not exclusively to a steerable, movable, load-carrying assembly.

The present invention also includes a centralising mechanism for use with such load-carrying assemblies to assist in steering of the overall assembly.

DEFINITIONS

Throughout this specification reference will be made to a perambulator, pusher or push-chair for babies, invalids and the like. It should be understood that such preferred embodiments are given by way of example only and the invention is not to be considered to be limited to such usage. Indeed, the present invention will be suitable for use in any assembly intended to be propelled by human effort rather than motive power including, for example, trolleys, carts, shopping trolleys, wheel barrows, strollers, toy prams, trailers, caravans, boat trailers, wheeled jacks for vehicles, wheel chairs, gurnies, hospital beds, hospital stretchers mounted on a wheeled base, work platforms, library trolleys, and other similar articles having a number of wheels and/or castors.

Throughout this specification, reference to a wheel or wheels is to be taken as including a reference to a castor or castors, or a wheel acting as a castor.

Furthermore, throughout this specification reference to a chassis is to be taken as including reference to a framework.

BACKGROUND OF THE INVENTION

In accordance with the known prior art, perambulators normally have fixed wheels. This gives rise to undue and undesirable hardship in their use. For example, the turning circle of fixed wheel perambulators can be rather large, with obvious limitations and consequences. Also, there can be scrubbing of the wheels when turning thus increasing wear.

In accordance with the prior art, moveable assemblies of the aforementioned type can be said to be one of three forms:

(i) a first where all four wheels are fixed and not in any way steerable (for example, traditional forms of perambulators);
(ii) a second (for example, child strollers and the like) having the rear wheels fixed, whilst the front wheels are swivellable; or
(iii) a third where all four wheels are separately swivellable (for example, supermarket trolleys).

In practice it has been found that each of the three forms exhibit a number of advantages which make them suited to certain uses, but suffer from disadvantages which limit their suitability for all uses.

When all four wheels are fixed (the first form), one advantage is that the wheels can be quite large in diameter, thus allowing the assembly to more easily traverse uneven terrain. Another advantage is that such assemblies are suitable for use along pathways where the operator does not need to concentrate on manoeuvring the assembly in normal travel and only has to do so when a change of direction is required. Therefore, when larger diameter wheels are used with fixed wheel assemblies, the ride is smoother for the occupant, an important result when the occupant may be a baby. It has also been found that fixed wheel assemblies may traverse a slope or undulating ground without there being excessive exertion by the operator to keep the assembly in the desired direction other than when a change in direction is required.

Such fixed wheel assemblies suffer from the disadvantage that it is difficult to change direction. Two commonly used methods are to either push down on the handle to lift the front wheels off the ground and to pivot the handle horizontally to point the assembly in the desired new direction of travel; or to lift the handle so that the rear wheels leave the ground and to pivot the handle horizontally to achieve the desired new direction of travel. Both of these alternatives can require the application of significant effort and skill.

Further disadvantages of such fixed wheel assemblies include the excessive wear and tear on the frame component of the overall structure, which can result in the frame being bent or distorted. Furthermore, the effort required by the operator may be excessive. As a result, assemblies of the fixed wheel type have been found to be unsuited for use as articles such as shopping trolleys, where frequent changes in direction are required and normally within a small area For the second form of assembly is that with fixed rear wheels and swivellable front wheels. Such assemblies have the advantages of being more easily manoeuvrable, in terms of both space and effort. However, this form has the disadvantage that it is necessary to utilise small-diameter wheels to enable the caster-style swivel action to allow the front wheels to rotate through 360 degrees as they are generally mounted or have to swivel under the assembly. The use of such smaller diameter wheels make it more difficult for the assembly to traverse rough or uneven surfaces, and also gives a far less comfortable ride to the occupant when compared with larger-diameter fixed wheeled assemblies. Furthermore, the swivellable front wheels are normally casters, or operate as caster wheels. In consequence they are not linked together and individually follow the terrain which can result in the swivellable front wheels facing in different directions, making it extremely difficult for the operator to maintain control, especially when the assembly is traversing a sloping surface. With such assemblies, when traversing a cambered or sloping surface it is necessary for the operator to maintain concentration and expend a significant effort to keep the assembly heading in the desired direction.

Assemblies with four separately swivellable wheels—the third form—have the advantages of being: very manoeuvrable; able to turn within their own length; and able to be used equally well and efficiently when pushed and/or pulled in either direction. Such assemblies have therefore being found to be specially suited for use as shopping trolleys, baby strollers and the like.

Such assemblies also exhibit a number of disadvantages. Firstly, such assemblies are best suited for use on horizontal, flat surfaces, with it being difficult to maintain control when moving such an assembly across a slope. Furthermore, as all wheels have to be able to rotate through 360 degrees, assemblies of this form can only be produced with smaller diameter wheels, once again giving rise to a less comfortable ride for the occupant even if the wheels are locked in the forward position, thereby allowing forward movement only. As all four swivel wheels are caster wheel sets, all may operate independently, especially when uneven surfaces are being traversed. As the wheels are not linked they can all be pointing in different directions at any given time. The assembly may therefore be difficult to control.

With known load-carrying assemblies there is a tendency for the direction of movement to be readily upset. A variety of means have been employed in an attempt to give improved steerability, but without success. The present invention seeks to overcome the problems and disadvantages of the prior art by providing a mechanism to retain steerable wheels of a steerable assembly in a position allowing for straight-forward motion, and which acts to return the steerable wheels to the position which corresponds to straight motion for the assembly. Preferably this is regardless of the extent to which the steerable wheels may be caused to shift due to variations in terrain, etc.

In a further aspect, the present invention preferably acts to prevent any tendency the assembly might exhibit to drift out of the position which corresponds to straight ahead motion and compensate for the tendency of the assembly to steer in anything other than a straight line.

PRIOR ART

There has been very little development of steering systems for load-carrying assemblies of the present invention. For example PCT/GB96/00687 discloses a trolley, such as a supermarket trolley, having a castor at each corner. The castors are arranged as a driving (rear) castor and as a driven (front) castor. A worm gear arrangement allows the driving castor on one side to drive the driven castor on that side such that when the driving castor turns in one direction, the driven castor turns in the opposite direction. However, there is no linkage of the castors from one side to the other. Therefore, the castors on one side could be turned to the right (rear) and left (front), and the castors on the other side could be turned to the left (rear) and right (front). This would defeat the entire exercise. Also it is only relevant for castors located immediately below the frame and is not useable for any other form of wheel, nor for any other form of product.

Furthermore, U.S. Pat. Nos. 4,348,033 and 4,405,140 elate to a steerable bob sled where the four runners of the sled are linked to enable them to be steered. However, the mechanism involved is a complex arrangement requiring numerous parts, with the use of cables and links. Furthermore, it is intended to controlled from within rather than without. This is a fundamental difference in that when controlled from within there is an occupant who can steer the apparatus and it is not intended to be steered by external forces. With a device such as a perambulator or child stroller, it is steered from without and is therefore intended inherently to be controlled by external forces. Furthermore, with devices such as perambulators and strollers, it is inherently intended that they not be controlled by internal forces otherwise a wriggling child or baby could control the direction of the perambulator or stroller, and this is totally contrary to what is required.

BRIEF SUMMARY OF THE INVENTION

In accordance with a first aspect of the present invention there is provided a moveable load-carrying assembly including a chassis having a plurality of wheels arranged as a first wheel set and a second wheel set, each wheel being rotatable and swivellable relative to the chassis; the wheels of the first wheel set being connected by a first linkage, and the wheels of the second wheel set being connected by a second linkage; and wherein one of the wheels of the second wheel set is linked to the opposite one of the wheels of the first wheel set by a link such that when one of the wheels of the first wheel set is swivelled in one direction relative to the chassis, all the wheels of the first wheel set swivel in that direction in unison and all the wheels of the second wheel set swivel in the opposite direction in unison.

Preferably, there are two wheels in the front wheel set. More preferably, there are two wheels in the rear wheel set. Advantageously, the chassis has a front transverse member and a rear transverse member. More advantageously, the front transverse member is the front linkage. Furthermore, the rear transverse member may be the rear linkage.

Preferably, the link is a bar or rod pivotally attached to one of the front wheels and to the diagonally opposite one of the rear wheels.

In accordance with a further aspect of the present invention there is provided a moveable load-carrying assembly wherein means are included to provide three distinct modes of operation for the rear set of wheels, the modes corresponding to straight-line travel (either forward or in reverse), fully-steerable travel (again either forward or in reverse), and a braking mode.

In accordance with another aspect of the present invention there is provided an apparatus for controlling the direction of travel of a steerable assembly, the apparatus including:

(i) a first member associated with a tie-rod operably connected to one or more steerable wheels of the assembly;
(ii) at least one further member associated with a fixed chassis member of the assembly, the at least one further member being selectively and continuously pivotably moveable relative to the fixed chassis member between respective inoperative and operative end positions; and
(iii) resilient means associated with the at least one further member,
the arrangement being such that, in use, when the steerable wheels of said assembly undergo a change in direction, the first member and the at least one further member come into contact, whereby the resilient means acts to return the at least one further member to its inoperative position, thereby correcting the steering of said assembly.

DESCRIPTION OF THE DRAWINGS

In order that the invention may be more clearly understood and put into practical effect, there shall now be described preferred embodiments of moveable load-carrying assemblies in accordance with the present invention, the description being by way of non-limitative example only and being with reference to the accompanying drawings, in which:

FIG. 4 is a view, similar to FIG. 3, of an alternative embodiment of an assembly in accordance with the present invention;

FIG. 5 is a partial top view of the alternative embodiment of FIG. 4;

FIG. 6 is top plan view of the embodiment of FIGS. 4 and 5, when in the straight-ahead mode;

FIG. 7 is a view, similar to FIG. 6, but when turning left;

DESCRIPTION OF PREFERRED EMBODIMENTS

Figure 1:
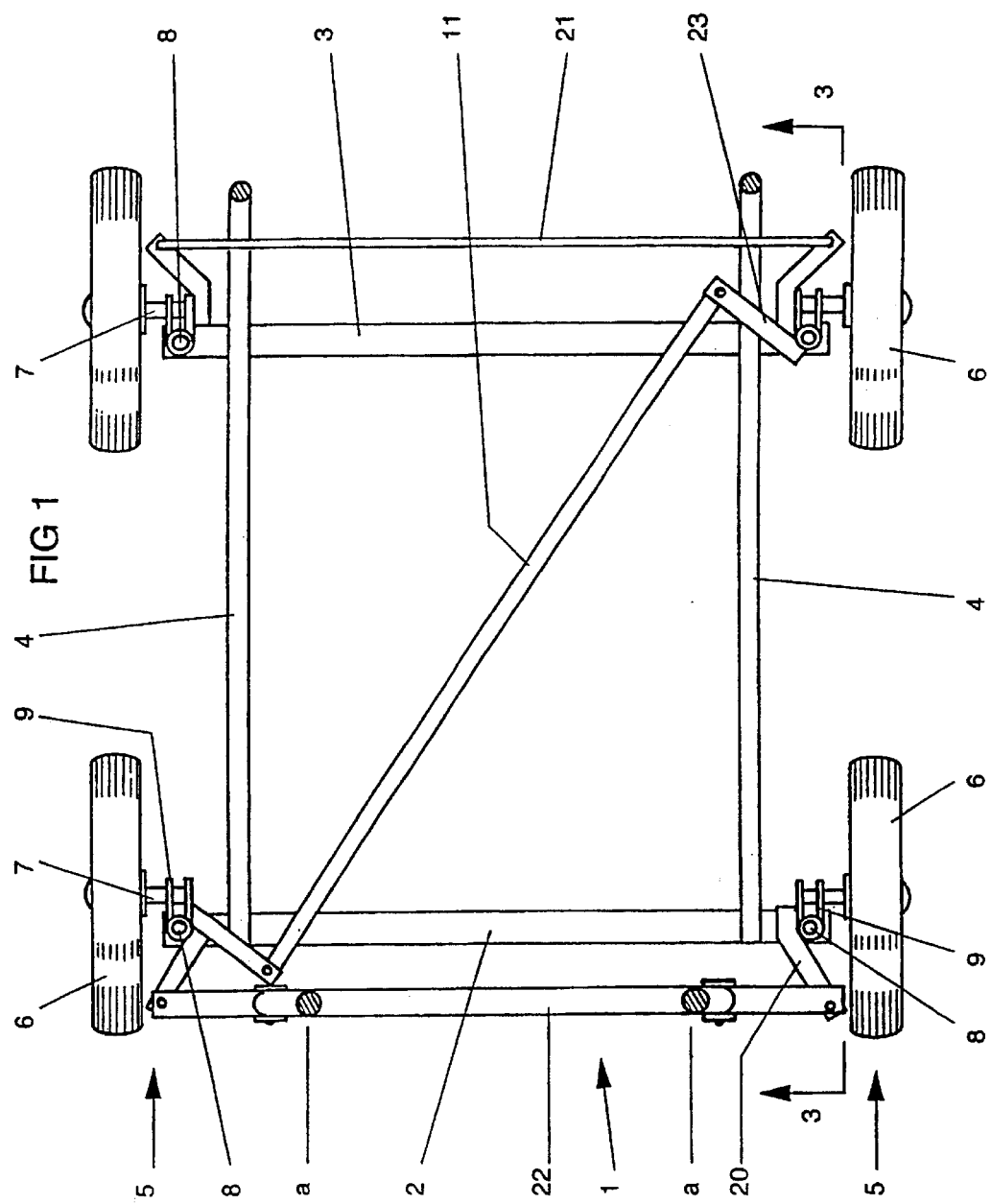
FIG. 1 is a top plan view of a first embodiment of a chassis of a moveable load-carrying assembly.
Figure 2:
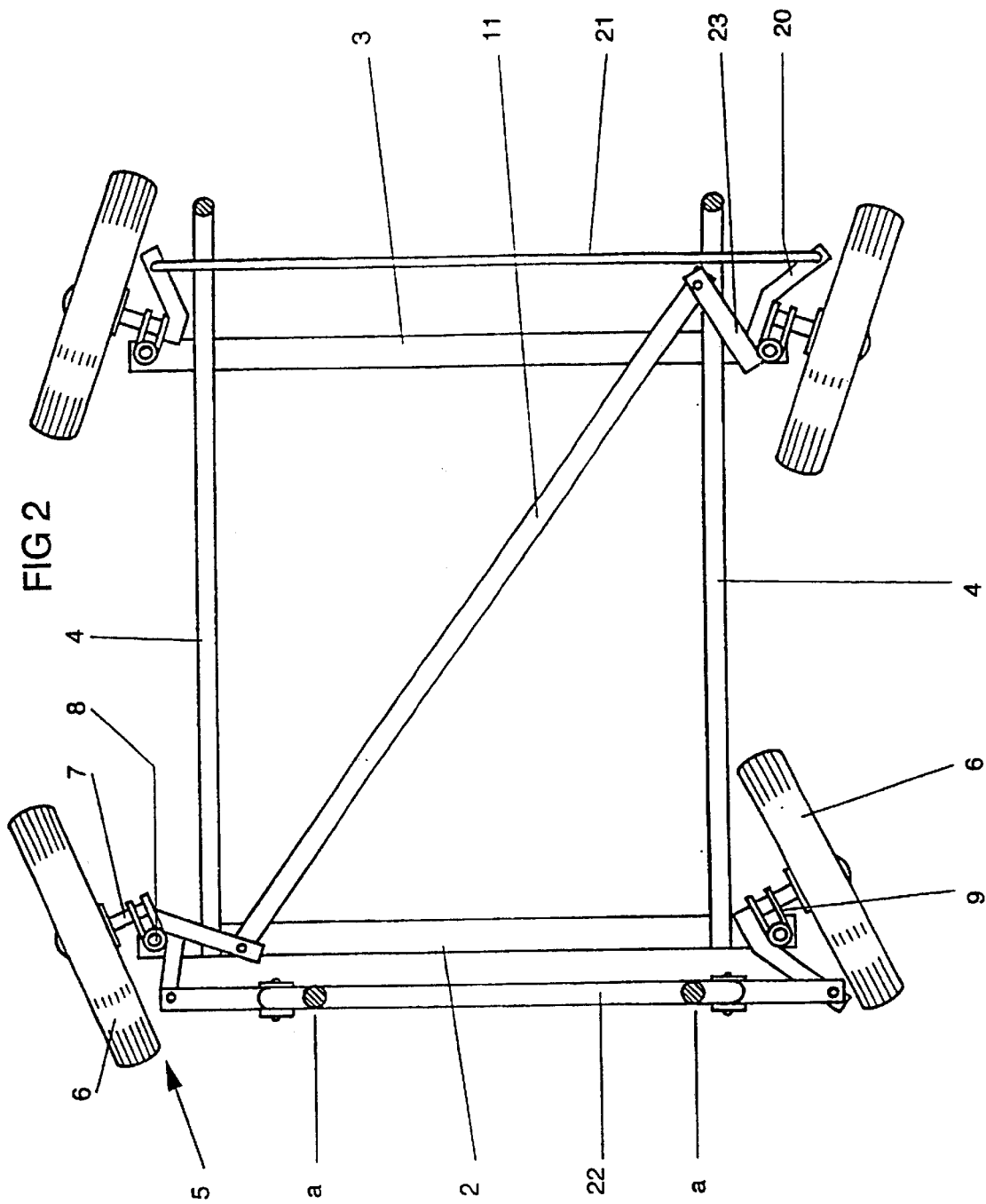
FIG. 2 is a view similar to FIG. 1, showing the assembly of FIG. 1 in its configuration best suited for turning wherein all wheels are steerable.
Figure 3:
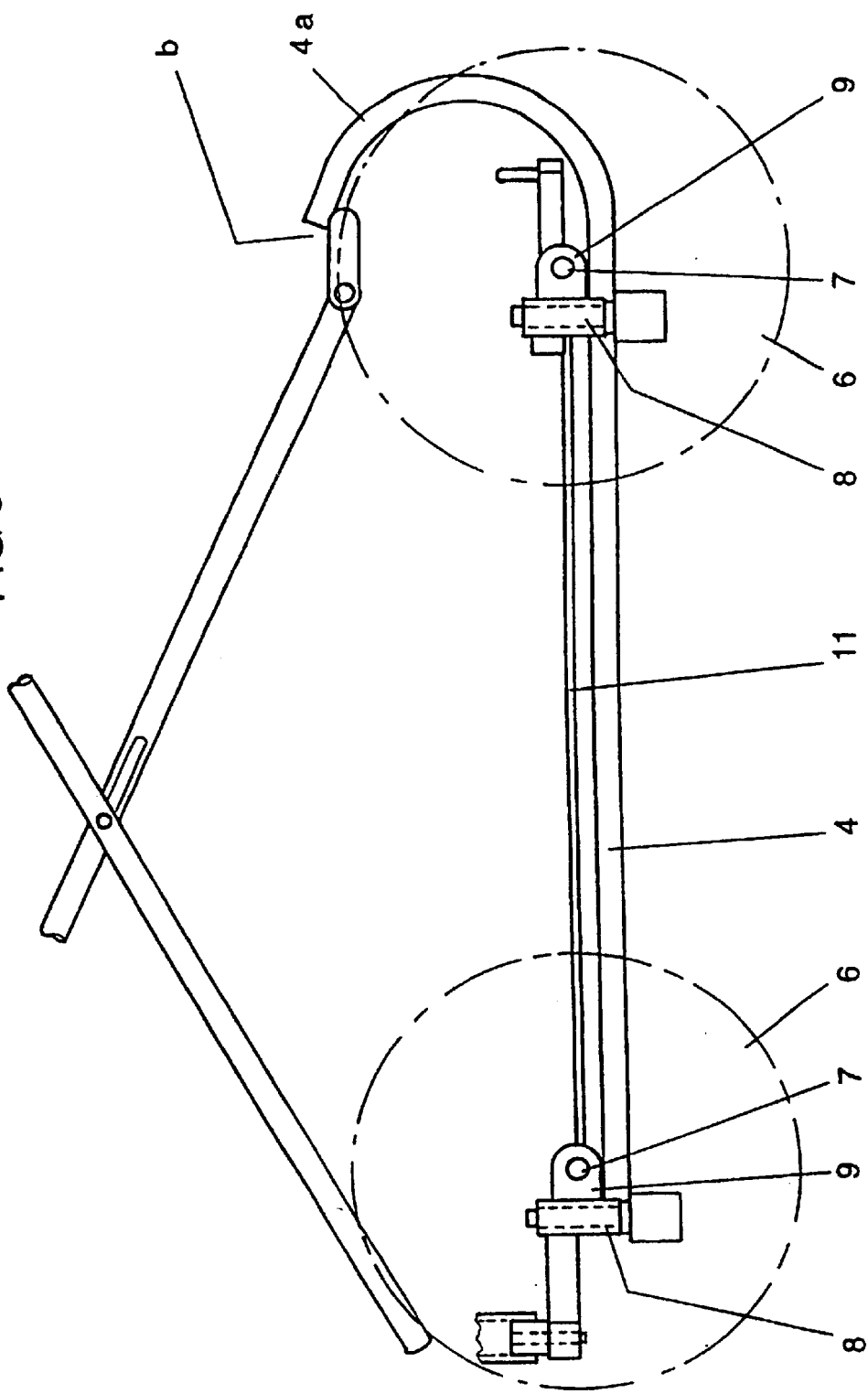
FIG. 3 is a cross-sectional view along the lines of and in the direction of arrows 3—3 of FIG. 1.

With reference now to FIGS. 1 to 3, there is illustrated a chassis made up from an interconnected arrangement of respective front and rear transverse members 2 and 3 respectively, and co-operating longitudinal members 4. The members 2, 3 and 4 make-up the chassis 1 and are interconnected in any known manner, as for example by welding, bolting, pinning, etc., to give a substantially rigid chassis 1. As shown in FIG. 3, the members 4 are each an elongate member having a longitudinal portion 4b and, extending from the rearward end thereof, an accurate portion 4a, the accurate portions 4a being adapted, in use, to receive and preferably releasably retain a collapsible assembly which in turn is adapted to co-operate with a load-carrying means.

Mounted at or in the vicinity of each end of each of the transverse members 2, 3 are wheel assemblies 5. Wheel assemblies 5 are made up of a wheel 6, a stub axle 7 on which the wheel 6 is mounted for rotation, a swivel axle 8 fixedly connected to the transverse member 2, 3, and a boss 9 pivotably mounted relatively to the swivel axle 8, preferably with the use of brushings or bearings of an appropriate type. The boss 9 is rotatably yet releasably mounted relative to the swivel axle 8 by use of a split pin or the like. The stub axle 7 is associated with the boss 9 in such a way that it is substantially at right angles to swivel axle 8. Each wheel 6 is rotatable about its stub axle 7, and also pivotable or swivellable relative to the chassis 1, around the respective swivel axle 8. In an alternative (not shown) a caster, made-up of two juxtaposed wheels with each wheel mounted for rotation on a free end of a stub axle, is mounted, via a boss and pintle, for pivoting or swivelling movement relative to the chassis 1.

One of the front wheels 6 is connected via a suitable linkage 11 to the opposed one of the rear wheels 6. The front wheels 6 are linked together, in any suitable manner, and the rear wheels 6 are also linked together. The end result of such an arrangement is that all four wheels 6 are steerable, with the front and rear pairs of wheels being respectively moveable in opposite directions.

With reference now to FIGS. 1 and 2, each boss 9 has associated therewith, and extending at an angle therefrom, an attachment member 20. The attachment members 20 are preferably somewhat boomerang-shaped so that the front portion 20a thereof may, if desired, contact the longitudinal member 4 prior to the wheel 6 making contact therewith, thus acting as a limit to the swivel action of the wheels 6 relative to chassis 1. The attachment members 20 associated with the rear wheels 6 are interconnected via a rear linkage 21, and the attachment members 20 associated with the front wheels 6 are interconnected via a front linkage 22. One of the rear wheels 6, and the opposed (diagonal) one of the front wheels 6, has associated therewith a further member 23 fixedly attached to the boss 9 and extending at an angle to both the boss 9 and the attachment member 20. The two further members 23 are interconnected via the link 11 so that when the rear wheels 6 are pivoted or swivelled in a given direction about their swivel axles 8, the front wheels 6 pivot or swivel in the contrary direction about their respective swivel axles 8. In such a way fully controllable steering for the overall chassis 1 and associated wheel assemblies 5 is achieved. The assembly is such that each wheel 6 is subjected to or operates in a caster-type action.

A body to be attached to chassis 1 would preferably be attached to front linkage 22 at points a (FIG. 1), and preferably pivotally attached at the rear at b (FIG. 3). In this way the body can be used to control the direction of the front wheels 6 by acting directly on link 22 to thus control the relevant wheels 6.

With reference now to FIGS. 4 to 12 of the drawings, there is illustrated an alternative embodiment of a moveable load-carrying assembly. The same numbering system is employed as with the embodiment of FIGS. 1 to 3. The alternative embodiment includes a chassis 1 made up from an interconnected arrangement of respective front and rear transverse members 2, 3 and co-operating longitudinal members 4. The various members 2, 3 and 4 making up the chassis 1 are connected together in any known manner, as for example by welding, bolting, pinning, etc., to give a substantially rigid structure.

There may be two front transverse members 2, mounted one above the other; and two rear transverse members 3, also mounted one above the other. The longitudinal members 4 extend between them. The actual configuration for the chassis 1 does not constitute an essential part of the invention.

Mounted at or in the vicinity of each end of each of the transverse members 2 and 3 are wheel assemblies 5. The assemblies 5 are made up of a single wheel 6, a stub axle 7 on which the wheel 6 is mounted for rotation, a swivel axle 8 fixedly connected to and extending between the pairs of transverse members 2 and 3, and a boss 9 pivotably mounted on the swivel axle 8, preferably with bushings or bearings of an appropriate type. The bosses 9 are rotatably yet releasably mounted relative to the swivel axle 8. The stub axle 7 is associated with the boss 9 so that it is substantially at right angles to the swivel axle 8. As a result, the wheel assemblies 5 have a caster action, being swivellable relative to the chassis 1.

One of the front wheels 6 is connected via a suitable link 11 to the opposed one of the rear wheel 6. The front wheels 6 are linked together in any suitable manner; and the rear wheels 6 are also linked together. Preferably, the boss 9 for each front wheel assembly 5 is fixedly, yet pivotably, connected to a further linkage—in the form of a rod or the like extending transversely of the chassis 1. In like manner the opposed rear wheel assemblies 5 are fixedly yet pivotably linked, by means of a further transverse member or linkage. The end result of such an arrangement is that all four wheels are steerable.

In like manner to the embodiment of FIGS. 1 to 3, the boss 9 of the at least one of each of the front and rear wheel assemblies 5 has associated therewith and extending at an angle therefrom a further member 23. The further members 23, of opposed ones of the front and rear wheels 6, are interconnected by the link 11. Attachment members 20 of the boss 9 of the front wheels 6 are interconnected via linkage 22 to have the front wheels pivotable (swivellable) in unison relative to the chassis 1. In a similar manner, the opposed rear wheels 6 are interconnected via a linkage 21, to have the rear wheels 6 also pivotable (swivellable) in unison. The end result is that when the rear wheels 6 are pivoted or swivelled in a given direction relative to the chassis about their respective swivel axles 8, the front wheels 6 pivot or swivel in the opposite direction.

If desired, for this embodiment, the transverse members 2, 3 may be combined into a central transverse member this making chassis 1 approximately H-shaped. Alternatively, transverse members 2, 3 can be deleted and replaced by a basket 29 of wire or the like which would be securely and/or releasably mounted between longitudinal members 4, in which case the basket 29 adds to the structural strength of chassis 1, and would be considered part of chassis 1.

In the embodiment illustrated in FIGS. 4 to 10, the chassis 1 and associated wheels 6 are able to be set in one of three operating modes, including:

(i) a first mode where all wheels 6 are lockable in direction yet are rotatable thereby facilitating straight-line motion either forward or reverse;
(ii) a second mode where the wheels 6 are steerable, being both rotatable about their respective stub axles 7 and swivellable about their respective swivel axles 8; and
(iii) a third mode where the rear wheels 6 are to locked against rotation.

With particular reference to FIGS. 8 to 11 illustrated therein are the three operating modes. Fixedly mounted to the at least one of the rear swivel axles 8 is a longitudinally and outwardly-projecting locating member 30. Associated with attachment member 20, now part of boss 9, for each rear wheel 6, and pivotably mounted thereon and relative thereto, are respective lever members 31, each lever member 31 in turn being connected to an adjacent end of a linkage member 21 extending transversely of the chassis 1. The lever member 31 is pivotably attached to attachment member 20 by any suitable means such as, for example, a pin 33. The lever member 31 has extending therefrom and at substantially right angles thereto a stud 34 which co-operates with the shaped rear end portion of the attachment member 20 in a cam-follower type arrangement.

Figure 9:
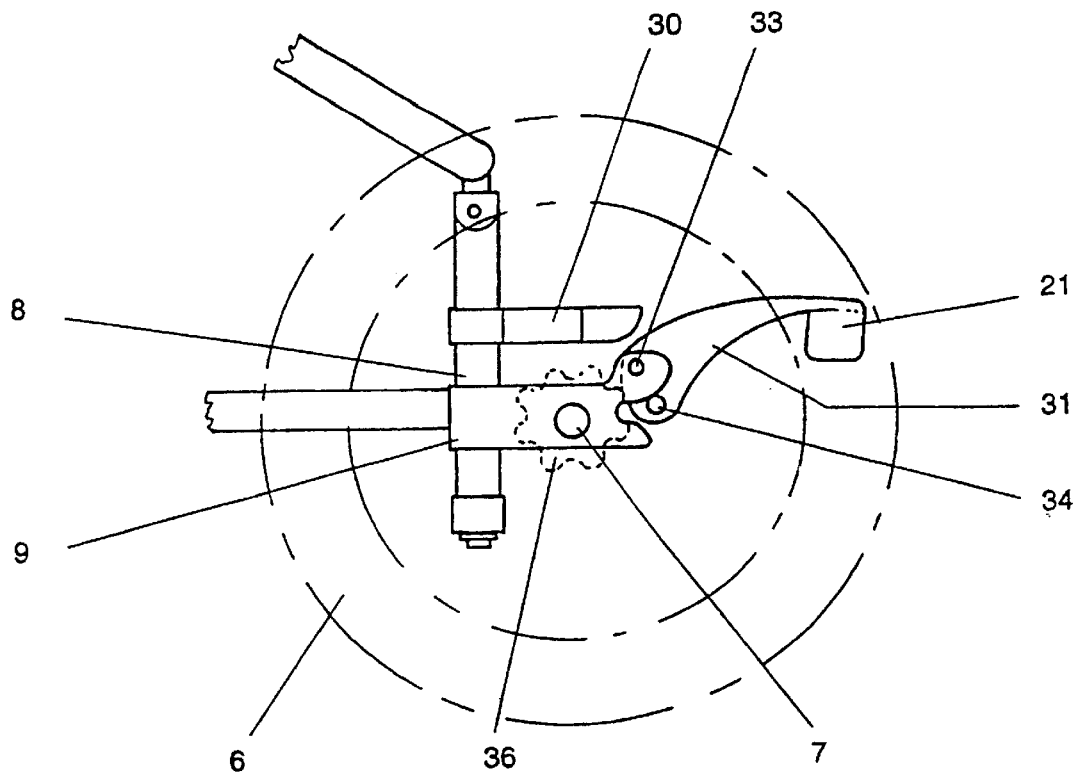
FIG. 9 is a view similar to FIG. 8, showing a rear wheel of the alternative embodiment of FIG. 4 in a second configuration, wherein all wheels are swivellable.
Figure 8:
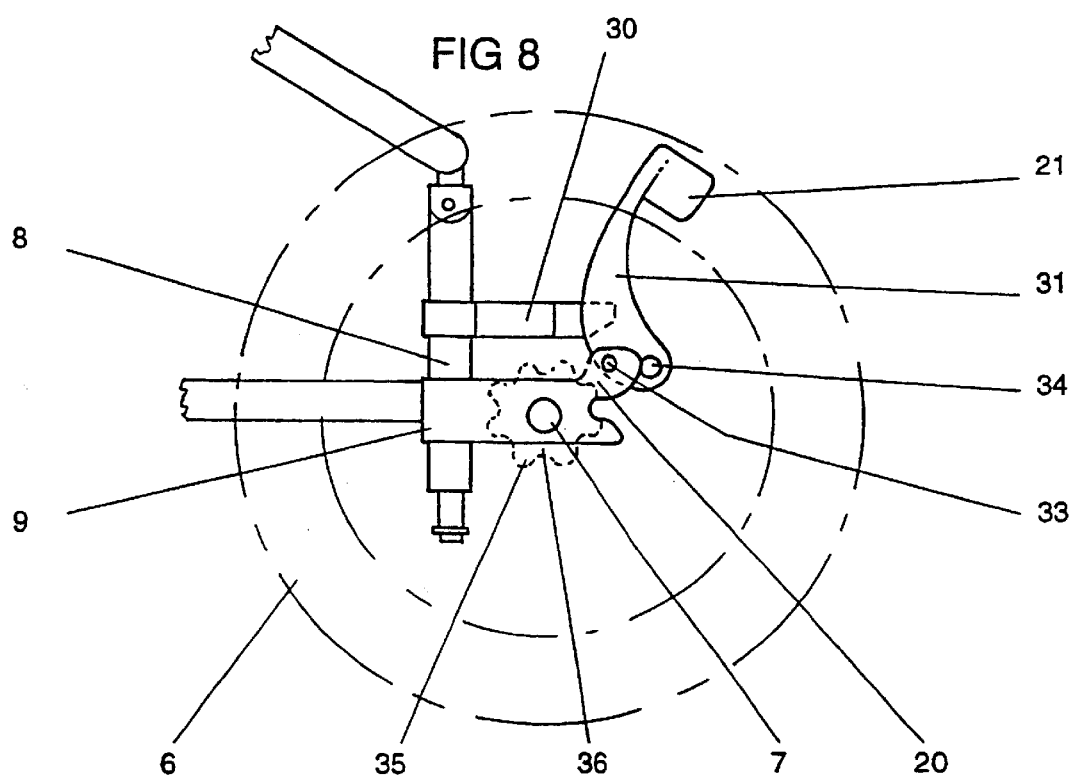
FIG. 8 is a side view of one of the rear wheels of the assembly of FIGS. 4 to 7, when in its locked configuration, wherein all wheels are fixed against any swivelling, with the overall arrangement acting in a conventional manner.
Figure 11:
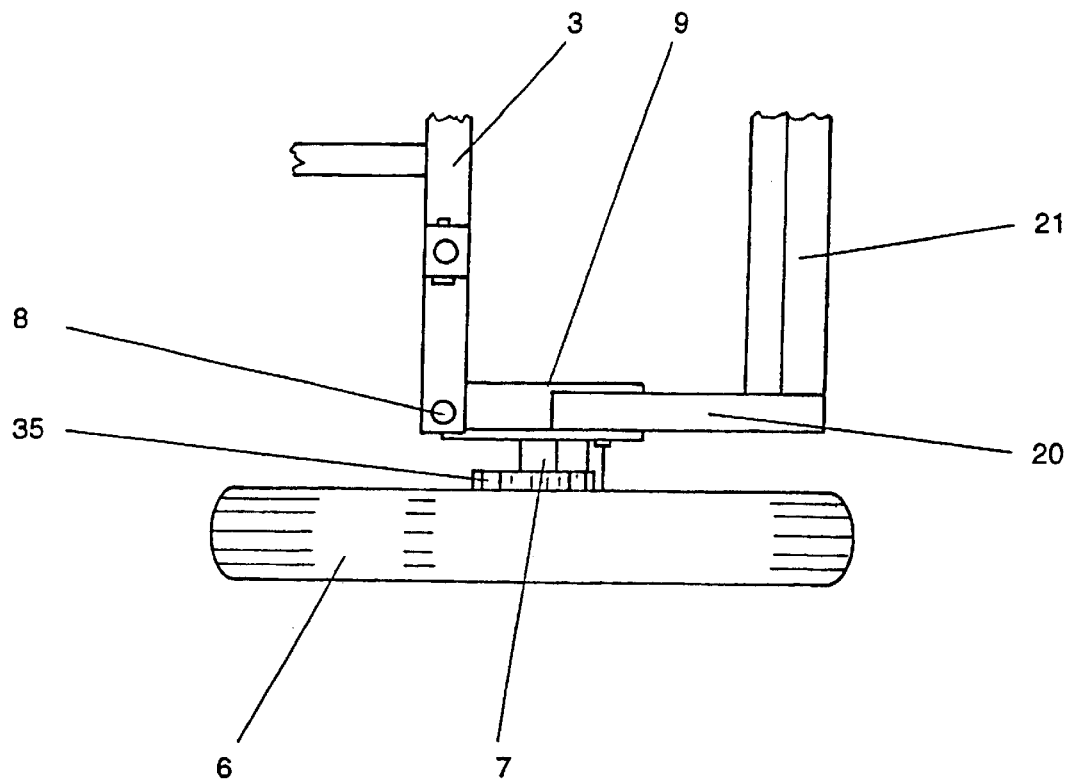
FIG. 11 is a view taken along the lines of and in the direction of arrows 11—11 of FIG. 10.
Figure 10:
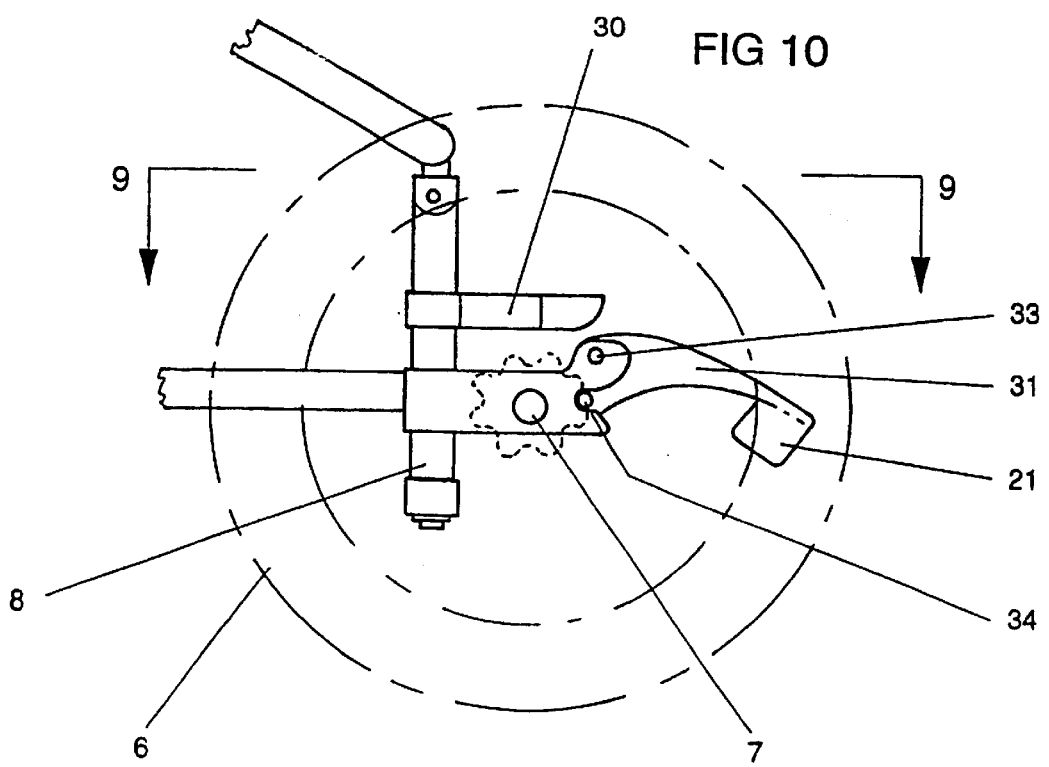
FIG. 10 is a view similar to FIGS. 8 and 9 but showing the rear wheels in a third configuration, being a braking mode.

The lever member 31 is selectively movable between the three positions illustrated in FIGS. 8, 9 and 10 respectively, each position corresponding to the three modes of operation. The application of a force to the linkage member 21, as for example by the foot of an operator, can impart movement to the assembly of linkage member 21 and associated lever members 31, thereby moving the assembly to the desired position to achieve the desired mode of operation.

When in the position shown in FIG. 8, the lever member 31 engages locating member 30, thereby preventing swivelling movement of the rear wheels 6—and in turn the linked front wheels 6—yet still allowing for rotation of the wheels themselves. In this mode, all wheels 6 are in a position to allow straight ahead motion.

When moved to the position shown in FIG. 9, all wheels 6 are rotatable, and also swivellable, the overall assembly thus being steerable as is described above.

When the lever member 31 is moved to the position shown in FIG. 10, the stud 34 contacts between internally directed projections 35 disposed around the hub 36 of the rear wheels 6 to prevent rotation of the rear wheels 6.

Figure 12:
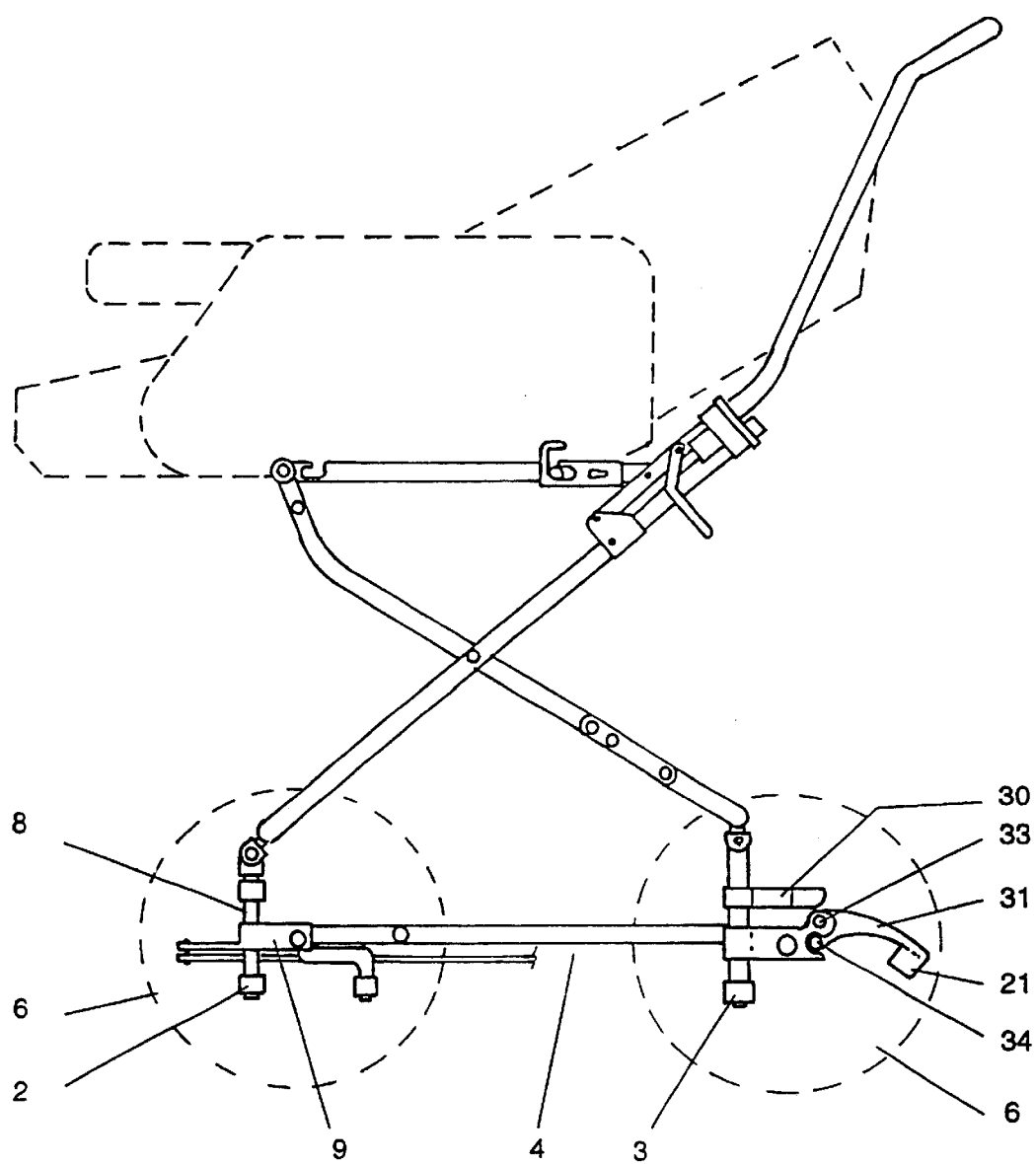
FIG. 12 is a side elevational view of an assembly in accordance with the present invention, with the alternative embodiment of FIGS. 4 to 11.

With reference now to FIG. 12, there is illustrated a framework adapted to receive, and releasably retain thereon, a suitable means for containing a load—as for example a tray or the like, a bassinette, etc. The arrangement as illustrated is adapted, in any known manner as for example by pinning, to be releasably or fixedly connected to a steerable wheeled assembly of the type referred to earlier.

If desired, the locating member 30 may be incorporated into arcuate portion 4a of longitudinal member 4 so that stud 34 can engage in a suitable slot or indentation (not shown) in arcuate portion 4a.

When compared with known assemblies, the assembly of the present invention has been found to exhibit important advantages. As all wheels are mechanically linked, and are capable of being used either in fixed wheel or fully steerable modes, all the advantages associated with a fixed wheel assembly may be achieved, but without any of the inherent disadvantages—as referred to earlier in the description— being associated therewith. Furthermore, the advantages associated with four-wheel steerable assemblies are evident, again without the disadvantages. The same can be said with comparing the assembly of the present invention with known assemblies which employ four separate swivel wheel sets.

Also, as the wheels 6 are outside the periphery of chassis 1, there is no upper or lower limit on the diameter of wheels 6 so that large diameter wheels 6 may be used (to give a smoother ride) yet they are still capable of being steered in the same manner, and to substantially the same extent, as smaller diameter wheels.

Figure 13:
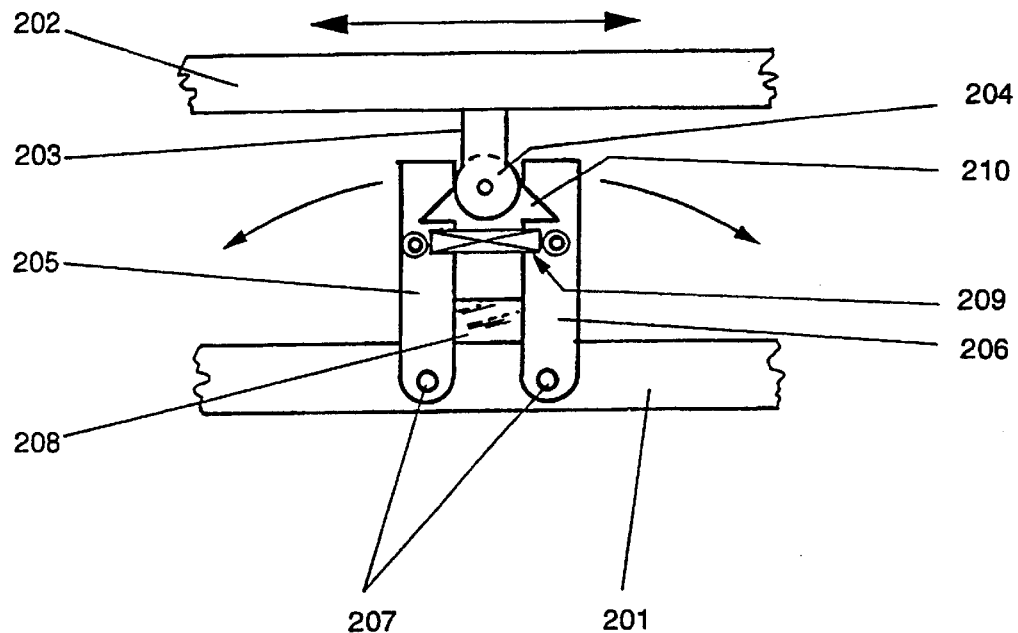
FIG. 13 is a partial view, in rear elevation, of a further embodiment of the present invention incorporating a centralising mechanism.

With reference to the embodiment of FIG. 13, it should be realised that it is adapted to be disposed between a first, fixed bar or the like member 201, constituting a lateral frame members of the chassis of a perambulator, pusher, trolley or the like equipment, and a moveable bar or tie-road 202 extending laterally between steerable wheels of the perambulator, pusher, trolley or the like equipment.

The moveable tie-rod 202 will be moveable in the direction of the arrows (see FIG. 13) in response to swivelling of the wheels of the assembly, the swivelling of wheels could come about for a variety of reasons or due to a number of factors.

A member 203 is affixed, in any known manner, as for example by welding, to the tie-rod 202 and adapted to extend substantially normally therefrom. The member 203 may take the form of a rod-like member having a rotatable means, as for example a roller 204, appropriately disposed at the free end thereof.

Extending normally from the fixed chassis member 201, in the direction of the tie-rod 202, are two spaced-apart substantially straight members 205 and 206, each of which is pivotably moveable in the direction of the arrows relative to the fixed member 201. The pivotable movement can be achieved in any known manner, as for example by having the members 205 and 206 pinned to the fixed member 201 at 207. Also extending substantially normally from the fixed member, and interposed between the spaced-apart members 205 and 206, is a spacing means 208 intended to maintain the spacing therebetween and being in the form of a protrusion attached to the fixed member 201 in any known manner, again as for example by welding. The members 205 and 206 are interconnected at or in the vicinity of the uppermost free ends thereof by a resilient member 209 of any known type, as for example a spring.

The principle of operation of the centralising mechanism in accordance with the embodiment of FIG. 13 is that as the tie-rod 202 is moved, either to the left or the right, in response to a change in the direction of the wheels of the assembly, the roller means 204 engages one of the members 205 or 206. As a result, member 205 or 206 will move in the direction of the arrow, downwardly towards the fixed chassis member 201, against spring pressure generated by the resilient means 209. The resilient means 209 functions to attempt to return the member 203 and associated roller means 204 to the position shown in FIG. 13, where it is disposed between the upper free ends of the opposed members 205 and 206, but not in contact therewith. Therefore, the tie-rod 202 is forced to move in the opposite direction, thereby tending to straighten the wheels of the assembly to the straight-ahead position. As can be seen, therefore, the mechanism acts to compensate for any tendency for the assembly to steer in a direction other than straight, and also acts to return to the straight ahead position after it has been turned.

Each member 205, 206 has a substantially V-shaped cut-out 210 therein, which tends to apply uneven pressure to the roller means 204 as it moves out of the central position illustrated.

As only a single resilient means 209 is used to achieve the centralising function, regardless of the direction of movement of the tie-rod 202, the arrangement acts in simplistic yet effective manner. There is, for example, no need to select evenly balanced springs, which would have been the case if a single spring means was to be associated with each member 205, 206 since with the present arrangement the same force will be applied to both steering directions.

With the embodiment of FIG. 13 as soon as the tie-rod 202 is shifted away from the position shown, which corresponds to straight-forward motion for the assembly, the spring 209 acts to attempt to return the tie-rod 202 to that position, thereby regaining straight-forward motion. The more off-set is the member 203 from the position illustrated due to variations in terrain, or tightness of turning the greater is the spring tension acting to return the member to the position illustrated.

Figure 14:
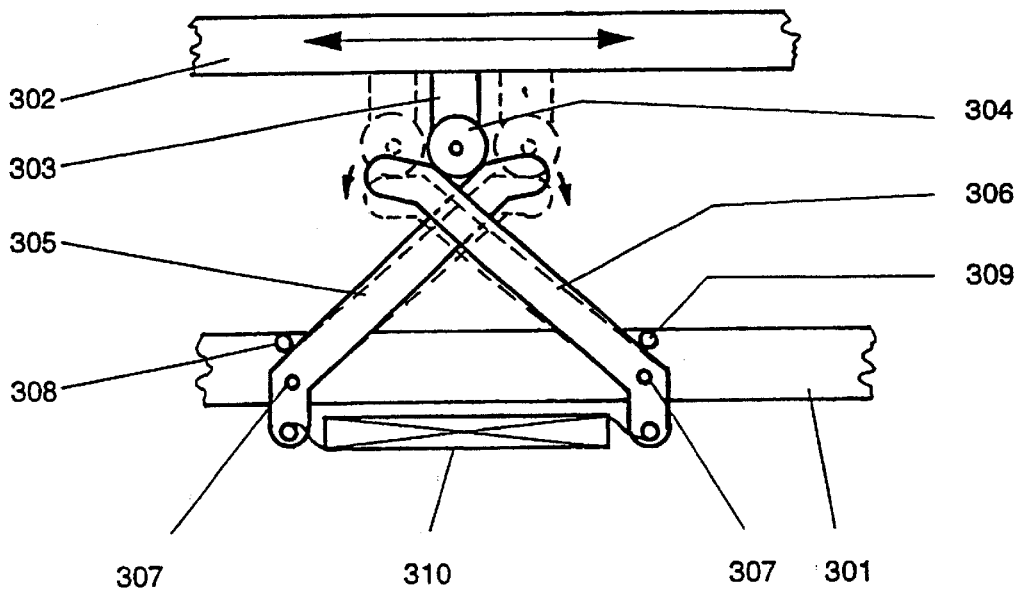
FIG. 14 is a view, similar to FIG. 13, of an alternative form of a centralising device or mechanism in accordance with the present invention.

The embodiment of FIG. 14 shows, in full lines, the arrangement intended to steer the assembly in a straight line. In phantom there are shown what transpires when the assembly is affected in any way so as to be travelling in a direction other than straight ahead.

In similar manner to the embodiment of FIG. 13, the alternative centralising mechanism of FIG. 14 is adapted to be disposed between a fixed bar or the like member 301, constituting one of the lateral frame members of the chassis of a perambulator, pusher, trolley or the like equipment; and a moveable bar or tie-rod 302 extending laterally between steerable wheels of the perambulator, pusher, trolley or the like equipment.

A member 303 is affixed in any known manner, as for example by welding, to the tie-rod 302 and is adapted to extend substantially normally therefrom. The member 303 preferably takes the form of a rod-like member having a rotatable means, in the form of a roller generally designated 304, appropriately disposed in any known manner at the free end thereof.

Affixed to the fixed member 301 and adapted to be pivotably moveable relative thereto are two arm members 305 and 306, the arm members 305 and 306 being pivotably moveable relative to the fixed member 301 in the direction of the arrows, dependent upon whether or not the assembly is travelling either to the left or right. The pivotable movement can be achieved in any known manner, as for example by having the arm members pinned at 307 to the fixed member 301. A suitable resilient means, as for example a spring 310, can be extended between the respective free ends of the arm members 305 and 306, the spring means 310 being provide a bias to return the arm members 305, 306 to the position shown in full lines in FIG. 14. Means are provided for limiting the extent of pivotable movement of the arm members 305 and 306 relative to the fixed member 301. Preferably, such means will take the form of pins 308 and 309 on the fixed member 301 and intended to contact a surface of the arm member 305 or 306.

When in the position shown in full lines in FIG. 14, corresponding to the straight ahead position, the roller 304 has no force applied thereto as the stop pins 308 and 309 act to prevent the arm members 305 and 306 contacting roller 304.

As the tie-rod 302 moves either to the left or the right, the roller 304 contacts open of the arm members 305 or 306 to force the relevant arm member in a downward direction, as illustrated by the arrows, against the pressure applied by the spring 310 until that edge of the arm member resting against the roller 304 is substantially parallel to the fixed member 301. When in that position no further pressure is applied to the roller 304. Therefore, the operator would feel resistance either side of centre until the relevant arm member 305 or 306 moves downwardly towards the fixed member 301 to its maximum possible extent, at which time there is no further resistance to steering.

This will tend to hold the steering in the central position but would have little if any effect on any other steerable position. The shape of the free end of the bar members 305 and 306 could be varied to vary the "feel" given to the steering assembly. In an embodiment not illustrated, the free end of the or each arm member 305, 306 could be curved in an upwards direction, giving rise to increased tension the further the steering handle of the trolley was moved out of the straight-ahead position. In the embodiment illustrated, however, the shape of the free end of each arm member 305, 306 is such that spring tension is nullified when the overall assembly is steering in a direction other than straight-ahead.

The embodiment of FIG. 14 acts to counter any tendency for the steerable wheels of the assembly to "drift" away from the position corresponding to straight-ahead motion. In contrast to the embodiment of FIG. 13, the embodiment of FIG. 14 only acts within a predetermined range of displacement of the tie-rod 302 and associated member 303.

It will be understood that the invention disclosed and defined herein extends to all alternative combinations of two or more of the individual features mentioned or evident from the text or drawings. All of these different combinations constitute various alternative aspects of the invention.

It will also be understood that where the term "comprises" or its grammatical variants, is employed herein, it is equivalent to the term "includes" and is not to be taken as excluding the presence of other elements or features.

The claims defining the invention are as follows:

1. Apparatus for controlling the direction of travel of a steerable assembly, the apparatus including:
   (i) a first member associated with a tie-rod operably connected to one ore more steerable wheels of the assembly;
   (ii) at least one further member associated with a fixed chassis member of the assembly, the at least one further member being selectively and continuously pivotably moveable relative to the fixed chassis member between respective inoperative and operative end positions; and
   (iii) resilient means associated with the at least one further member, the arrangement being such that, in use, when the steerable wheels of said assembly undergo a change in direction, the first member and the at least one further member come into contact, whereby the resilient means acts to return the at least one further member to its inoperative position, thereby correcting the steering of said assembly.

2. Apparatus as claimed in claim 1, wherein the first member includes a rod securely attached to and extending generally perpendicular from the tie-rod towards the at least one further member, and rotatable means rotatably attached to the rod at the end thereof remote from the tie-rod.

3. Apparatus as claimed in claim 2, wherein the at least one further member includes a first further member and a second further member, the second further member being a mirror image of the first further member; the first further member and the second further member being pivotally attached to the fixed chassis member and having located therebetween the first member when in the inoperative end position: the resilient means extending between the first further member and the second further member.

4. Apparatus as claimed in claim 3, wherein each of the first further member and the second further member has an inner face, the inner faces facing towards each other, there being a substantially V-shaped out-out in each inner face, the rotatable means engaging in to out-out to provide uneven pressure to the rotatable means as it moves towards the operative end position.

5. Apparatus as claimed in claim 3, wherein the first further member and second further member are spaced apart and generally parallel when in the inoperative end position, the fixed chassis member having a spacing means secured thereto between the first further member and the second further member.

6. Apparatus as claimed in claim 4, wherein the resilient means is a spring extending between and pivotally attached to the first further member and the second further member, between the V-shaped out-out and the fixed chassis member.

7. Apparatus as claimed in claim 3, wherein each of the first further member and the second further member are in the form of an arm pivotally attached to the fixed chassis members adjacent a lint end of each of the first and second further members, the resilient means extending between the lint ends of each of the first and second further members.

8. Apparatus as claimed in claim 7, wherein each of the first and second further members has a second end remote from the first end, the first and second further members crossing intermediate the first and second ends to provide an X-shaped assembly; the rotatable means locating between the second ends, the second ends being shaped to provide a cam surface upon which the rotatable means can move.

9. Apparatus as claimed in claim 7, wherein the fixed chassis member has two pins extending outwardly therefrom to locate each of the first and second further members in the inoperative position.

10. A hand-movable load-carrying assembly including a chassis having a plurality of wheels arranged as a first wheel set and a second wheel set, each wheel being rotable and swivellable relative to the chassis; the wheels of the first wheel set being connected by a first linkage, and the wheels of the second wheel set being connected by a second linkage; one of the wheels of the second wheel set being linked to the opposite one of the wheels of the first wheel set by a link such that when one of the wheels of the first wheel set is swivelled in one direction relative to the chassis, all to wheels of the first wheel set swivel in that direction in unison, and all the wheels of the second wheel set swivel in the opposite direction in unison; and wherein each wheel has a substantially vertical swivel axle about which it can swivel relative to the chassis; a boss being mounted on each swivel axle, each wheel being rotably mounted on a stub axle, each stub axle being mounted to its respective boss remote from the swivel axle to enable each wheel to act in the manner of a caster;

said assembly fitted with an apparatus for controlling the direction of travel of a steerable assembly, the apparatus including:
(i) a first member associated with a tie-rod operably connected to one or more steerable wheels of the assembly;
(ii) at least one further member associated with a fixed chassis member of the assembly, the at least one further member being selectively and continuously pivotably moveable relative to the fixed chassis member between respective inoperative and operative end positions; and
(iii) resilient means associated with the at least one further member, the arrangement being such that, in use, when the steerable wheels of said assembly undergo a change in direction, the first member and the at least one further member come into contact, whereby the resilient means acts to return the at least one further member to its inoperative position, thereby correcting the steering of said assembly; and
wherein the tie-rod is the first linkage or the second linkage.

* * * * *